United States Patent
Bendixen et al.

(10) Patent No.: US 10,432,078 B2
(45) Date of Patent: Oct. 1, 2019

(54) MAGNETIC GEAR WITH A MAGNETIC FLUX CONDUCTOR ARRANGEMENT

(71) Applicant: Grundfos Holding A/S, Bjerringbro (DK)

(72) Inventors: Flemming Buus Bendixen, Hobro (DK); Frank Gravers Pedersen, Langå (DK); Peter Valler, Aalborg (DK); Henrik Rasmussen, Rødkærsbro (DK); Allan Ivo Søegaard, Hobro (DK)

(73) Assignee: Grundfos Holding A/S, Bjerringbro (DK)

( * ) Notice: Subject to any disclaimer, the term of this patent is extended or adjusted under 35 U.S.C. 154(b) by 335 days.

(21) Appl. No.: 15/321,611

(22) PCT Filed: Jun. 15, 2015

(86) PCT No.: PCT/DK2015/050168
§ 371 (c)(1),
(2) Date: Dec. 22, 2016

(87) PCT Pub. No.: WO2015/197067
PCT Pub. Date: Dec. 30, 2015

(65) Prior Publication Data
US 2017/0201167 A1 Jul. 13, 2017

(30) Foreign Application Priority Data

Jun. 24, 2014 (DK) .................... 2014 70383

(51) Int. Cl.
*H02K 49/10* (2006.01)
*F04D 13/02* (2006.01)
(Continued)

(52) U.S. Cl.
CPC ......... *H02K 49/102* (2013.01); *F04D 13/027* (2013.01); *F04D 13/06* (2013.01);
(Continued)

(58) Field of Classification Search
CPC .. H02K 49/102; H02K 49/108; F04D 13/027; F04D 13/06; F04D 25/026; F04D 25/06; F04D 29/22; F04D 29/28
See application file for complete search history.

(56) References Cited

U.S. PATENT DOCUMENTS

| 5,634,390 A | 6/1997 | Takeuchi et al. |
| 6,363,918 B2 * | 4/2002 | Håkansson ............... F01P 5/12 123/198 C |

(Continued)

FOREIGN PATENT DOCUMENTS

| CN | 2096843 U | 2/1992 |
| EP | 1283385 A1 | 2/2003 |

(Continued)

OTHER PUBLICATIONS

"International Application Serial No. PCT/DK2015/050168, International Preliminary Report on Patentability dated Jan. 5, 2017", 10 pgs.

(Continued)

*Primary Examiner* — Emily P Pham
(74) *Attorney, Agent, or Firm* — Schwegman Lundberg & Woessner, P.A.

(57) ABSTRACT

The present invention relates to a magnetic gear comprising a first magnetic rotor with a first shaft; and a second magnetic rotor with a second shaft; a support structure, with a first end shield and a second end shield connected by a stator or support element. A first bearing attached to the first end shield supports the first shaft and a second bearing supports the second shaft. The first and second magnetic rotors are displaced in axial direction from each other in an axial gap; and the first shaft and shaft are approximately aligned in opposite axial directions; and a plurality of magnetic flux conductors encircles the first and second magnetic rotors, thereby conducting magnetic flux from the first magnetic (Continued)

rotor to the second magnetic rotor. The magnetic gear comprises a dividing wall arranged in the axial gap between the first magnetic rotor and the magnetic second rotor, to separate a first chamber from a second chamber.

15 Claims, 7 Drawing Sheets (51) Int. Cl.
     *F04D 13/06*    (2006.01)
     *F04D 25/02*    (2006.01)
     *F04D 25/06*    (2006.01)
     *F04D 29/22*    (2006.01)
     *F04D 29/28*    (2006.01)

(52) U.S. Cl.
     CPC ........... *F04D 25/026* (2013.01); *F04D 25/06* (2013.01); *H02K 49/108* (2013.01); *F04D 29/22* (2013.01); *F04D 29/28* (2013.01)

(56) References Cited

U.S. PATENT DOCUMENTS

| | | |
|---|---|---|
| 2004/0066107 A1 | 4/2004 | Gery |
| 2008/0149445 A1 | 6/2008 | Kern |
| 2011/0057456 A1* | 3/2011 | Atallah ............... H02K 49/102 290/1 C |
| 2011/0121674 A1 | 5/2011 | Bright et al. |
| 2012/0291575 A1 | 11/2012 | Edwards |
| 2013/0002075 A1 | 1/2013 | Edwards et al. |
| 2013/0099615 A1 | 4/2013 | Stewart |
| 2013/0320795 A1 | 12/2013 | Enomoto et al. |

FOREIGN PATENT DOCUMENTS

| | | |
|---|---|---|
| EP | 1353436 A2 | 10/2003 |
| GB | 2472020 A | 1/2011 |
| GB | 2493484 A | 2/2013 |
| JP | 2012228737 A | 11/2012 |
| WO | WO-2007/135360 A1 | 11/2007 |
| WO | WO-2009/103994 A2 | 8/2009 |
| WO | WO-2009/130456 A2 | 10/2009 |
| WO | WO-2011/088945 A1 | 7/2011 |
| WO | WO-2013/137252 A1 | 9/2013 |

OTHER PUBLICATIONS

"International Application Serial No. PCT/DK2015/050168, International Search Report dated Sep. 30, 2015", 4 pgs.

"International Application Serial No. PCT/DK2015/050168, Written Opinion dated Sep. 30, 2015", 8 pgs.

* cited by examiner

MAGNETIC GEAR WITH A MAGNETIC FLUX CONDUCTOR ARRANGEMENT

CLAIM OF PRIORITY

This application is a U.S. National Stage Filing under 35 U.S.C. 371 from International Application No. PCT/DK2015/050168, filed on Jun. 15, 2015, and published as WO 2015/197067 A1 on Dec. 30, 2015, which claims the benefit of priority to Denmark Patent Application No. PA 2014 70383, filed on Jun. 24, 2014, each of which is hereby incorporated by reference herein in its entirety.

FIELD OF THE INVENTION

The present invention relates to a magnetic gear with soft magnetic composite material.

BACKGROUND OF THE INVENTION

Gearboxes and gear arrangements are utilized in a wide range of situations in order to couple drive mechanisms. Traditionally, gearboxes have been formed from gear wheels having appropriate teeth numbers and sizes to provide a desired gear ratio. Gearboxes based on gear wheels may be noisy, making them unacceptable for low noise environments.

More recently, magnetic gearboxes have been provided which comprise respective gear rotors with flux conductors in a radial air gap between the gear rotors. The rotors incorporate permanent magnets, and the flux conductors act to modulate the magnetic flux transferred between the gear rotors.

A magnetic gear offers the potential for a number of significant advantages over its mechanical gear counterpart such as overload protection, quiet operation, high reliability and the potential for high efficiency.

The prior art discloses radial magnetic gear topologies, which are difficult to construct, because of the flux conducting steel poles are made up of small steel segments situated between two rotors.

It is thus an objective of the present invention to design a magnetic gear with low magnetic losses, and which is easy to manufacture.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Thus, the above described object and several other objects are intended to be obtained in a first aspect of the invention by providing a magnetic gear comprising a first magnetic rotor with a first shaft; and
a second magnetic rotor with a second shaft;
a support structure, comprising a first end shield and a second end shield connected by a stator support element
wherein the first shaft is supported by a first bearing attached to the first end shield and the second shaft is supported by a second bearing, the first and second magnetic rotors are displaced in axial direction from each other in an axial gap; and
wherein the first shaft and second shaft are approximately aligned in opposite axial directions; and
wherein a plurality of magnetic flux conductors encircles the first and second magnetic rotors, thereby conducting magnetic flux from the first magnetic rotor to the second magnetic rotor;
characterized in that,
the magnetic gear comprises a dividing wall arranged in the axial gap between the first magnetic rotor and the magnetic second rotor, to separate a first chamber from a second chamber.

The invention is particularly, but not exclusively, advantageous in that the design provides low magnetic losses, and a design, which is simple to manufacture, compared with the prior art.

According to one embodiment of the invention, the first stator chamber is arranged for a first fluid and the second chamber is arranged for a second fluid.

An advantage of this embodiment is that it can operate with two different fluids, one in each chamber.

According to one embodiment of the invention, the first fluid is in a gaseous phase, and the second fluid is in a liquid phase.

According to one embodiment of the invention, the second chamber is arranged as a pumping chamber with an inlet and an outlet, and wherein the second magnetic rotor is arranged to drive an impeller for moving the second fluid from the inlet to the outlet of the second chamber.

According to one embodiment of the invention, at least the stator support element is made of a non-electrical conducting materiel, such as a polymer or a ceramic material.

According to one embodiment of the invention, the magnetic flux conductors are in molded in a polymer material of the stator support element.

An advantage of this embodiment is that the magnetic flux conductors are kept in position once molded in the polymer According to one embodiment of the invention, the second chamber is sealed with the polymer material.

According to one embodiment of the invention, the magnetic flux conductors are made of a soft magnetic composite.

An advantage of this embodiment is that the magnetic losses are reduced by using soft magnetic composite.

According to one embodiment of the invention, the shape of the magnetic flux conductors is triangular, with one side of triangle facing the magnetic rotor.

An advantage of this embodiment is that a triangular shape reduces magnetic losses.

According to one embodiment of the invention, each of the magnetic flux conductors is having a first tapered end and a second tapered end.

According to one embodiment of the invention, the plurality of magnetic flux conductors (3) being retained by the first and second end shields, According to one embodiment of the invention, at least one of the first and second magnetic rotors comprises an isotropic magnet.

According to one embodiment of the invention, at least one of the first and second magnetic rotor comprises Halbach array, for maximizing the magnetic torque.

According to one embodiment of the invention, a locking device retains the magnetic material; said locking device locks the magnetic material in at least one recess in the magnetic material of the rotor.

According to one embodiment of the invention, at least one electrical coil is inserted around at least one of the magnetic flux conductors.

Many of the attendant features will be more readily appreciated as the same become better understood by reference to the following detailed description considered in connection with the accompanying drawings. The preferred features may be combined as appropriate, as would be apparent to a skilled person, and may be combined with any of the aspects of the invention.

DETAILED DESCRIPTION OF THE INVENTION

The present invention will now be explained in further details. While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

Figure 4:
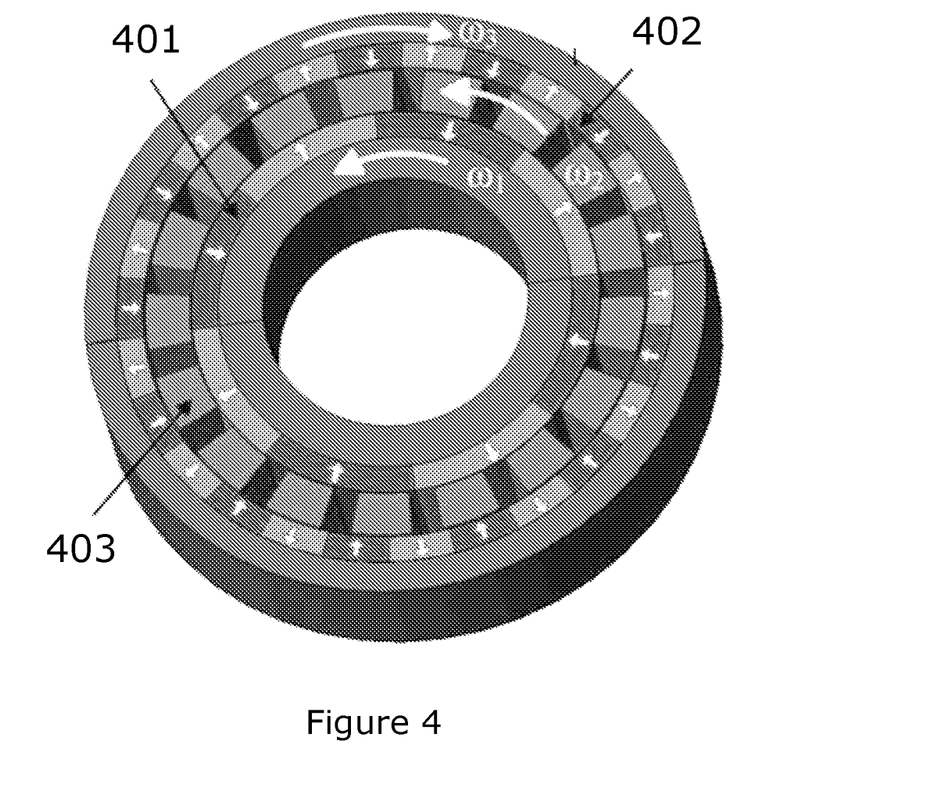
FIG. 4 shows a magnetic gear according to the prior art.

The prior art has disclosed a radial magnetic gear topology, which is shown in FIG. 4. The gear of FIG. 4 consists of permanent magnets (PMs) on an inner rotor 401 rotating at a first speed $\omega_1$, a middle rotor 403 with ferromagnetic steel poles that can rotate at an intermediate speed $\omega_2$, and another set of permanent magnets outer rotor 402 rotating at a second speed $\omega_3$. The inner and outer rotors that contain PMs, interact with the middle steel poles to create space harmonics.

If the relationship between the poles is chosen to be $p_1=(p_3-n_2)$, then the rotors will interact via a common space harmonic component, and the angular rotational velocities for each rotor are thereby related.

$$\omega_1 = \frac{p_3}{p_3 - n_2}\omega_3$$

Figure 5:
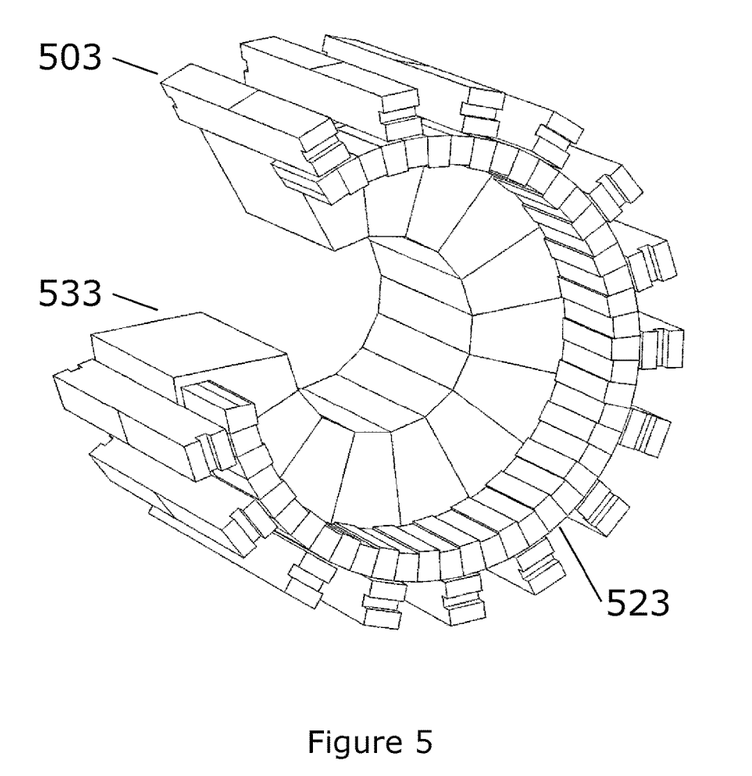
FIG. 5 shows the magnetic components of the invention.

The basic topology of the present invention is shown in FIG. 5. In this embodiment the magnets 523, 533 of each respective rotor, the magnetic flux is forced to pass through the magnetic flux conductors 503 in the axial direction. The flux density of the magnetic flux conductors 503 can be increased if the area of the magnet is chosen to be greater than the area of the magnetic flux conductors facing the air-gap.

The governing speed relationship for the radial and the present design is the same as given by the equation above. The pole combination, and was chosen.

The gear ratio between the first rotor and second rotor is P1/P2, where P1 is the number of magnetic poles on the first rotor and P2 is the number of poles on the second rotor, e.g. 28/8=3.5.

The number of magnetic flux conductor should be (P1+P2)/2, e.g. (28+8)/2=18.

The magnetic gear comprises two rotors a low speed rotor and a high-speed rotor.

Figure 1:
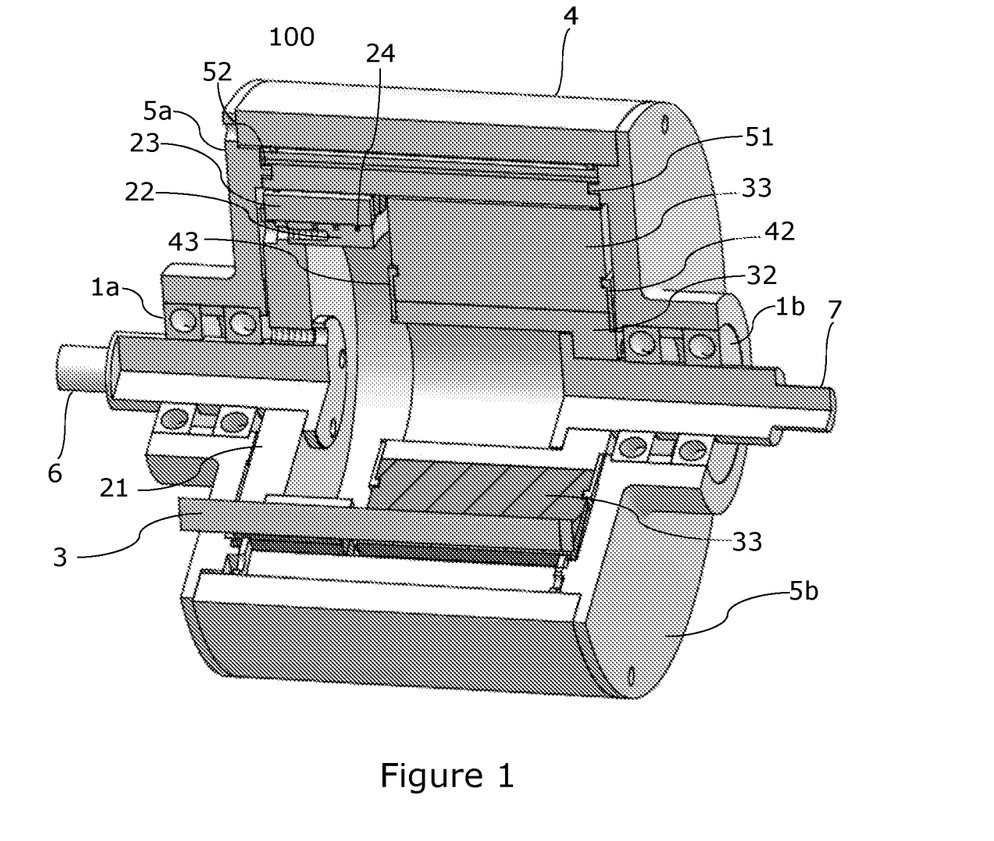
FIG. 1 shows a cut up of a magnetic gear according to the invention.

FIG. 1 shows a cut open embodiment of the invention. The magnetic gear 100 comprises a first shaft 6 and a second shaft 7, the first shaft 6 connects to flange 21, which again is connect to a rotor cylinder 22, on the out surface of the rotor cylinder 22 permanent magnets 23 are attached. The cylinder is made with a plurality of grooves 24 to minimize the effect of eddy currents. The first shaft 6 is supported by a first bearing 1a, which is attached to the first end shield 5a. There is also a second shaft 7, which connects to a second rotor cylinder 32, magnets 33 are attached to the rotor cylinder 32. The permanent magnets 33 are retained by a set of retainers 42, 43. The second shaft 7 is also supported by a bearing 1b, which is connected to a second end shield 5b.

The two end shields 5a, 5b are connected by a stator support element 4, in the figure the stator support element 4 is cylinder shaped, but other shapes may also be used.

Between the two end shields 5a, 5b magnetic flux conductors 3 are retained in recesses 51, 52 in the end shields 5a, 5b.

The magnetic reluctance made by the permanent magnets 23 when rotating the first shaft 6 causes high flux variations in the magnetic flux conductors 3, which then interacts when the permanent magnets 33 causing the second rotor to rotate.

Figure 2:
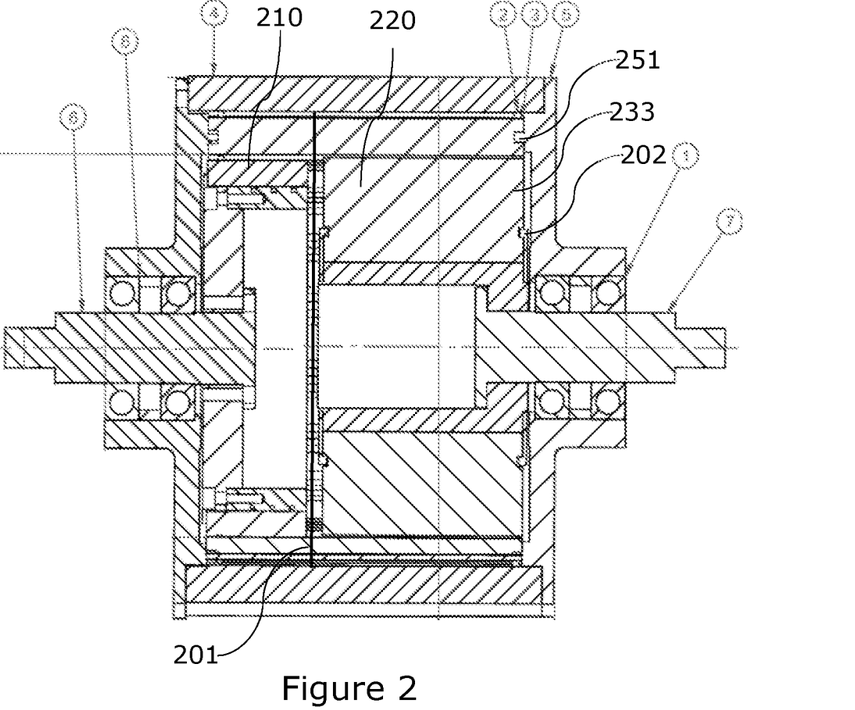
FIG. 2 shows a schematic drawing of a magnetic gear according to the invention seen from the side.

FIG. 2 shows a drawing of the side view of the magnetic gear. Many of the features in FIGS. 1 and 2 are the same, but in addition, FIG. 2 shows the recess 251 in the end shield for receiving the magnetic flux conductors 3. FIG. 2 also show a wall 201 dividing the space wherein the first rotor 210 and the second rotor 220 rotates. The construction with a bearing 1a, 1b at only one side of each rotor, enables an axial gap between the two rotors 210, 220. In addition, FIG. 2 also shows a recess 202 in the magnetic material for retaining the magnets 233 at the rotor during rotation.

The wall 201 inserted in the gap, ensures that the two rotors can operate with different fluids in the chambers; the first chamber is confined by the wall 201, the first end shield 5a and the stator support element 4. The other side of the wall 201, second end shield 5b and the stator support element 4 confines the second chamber.

Figure 3:
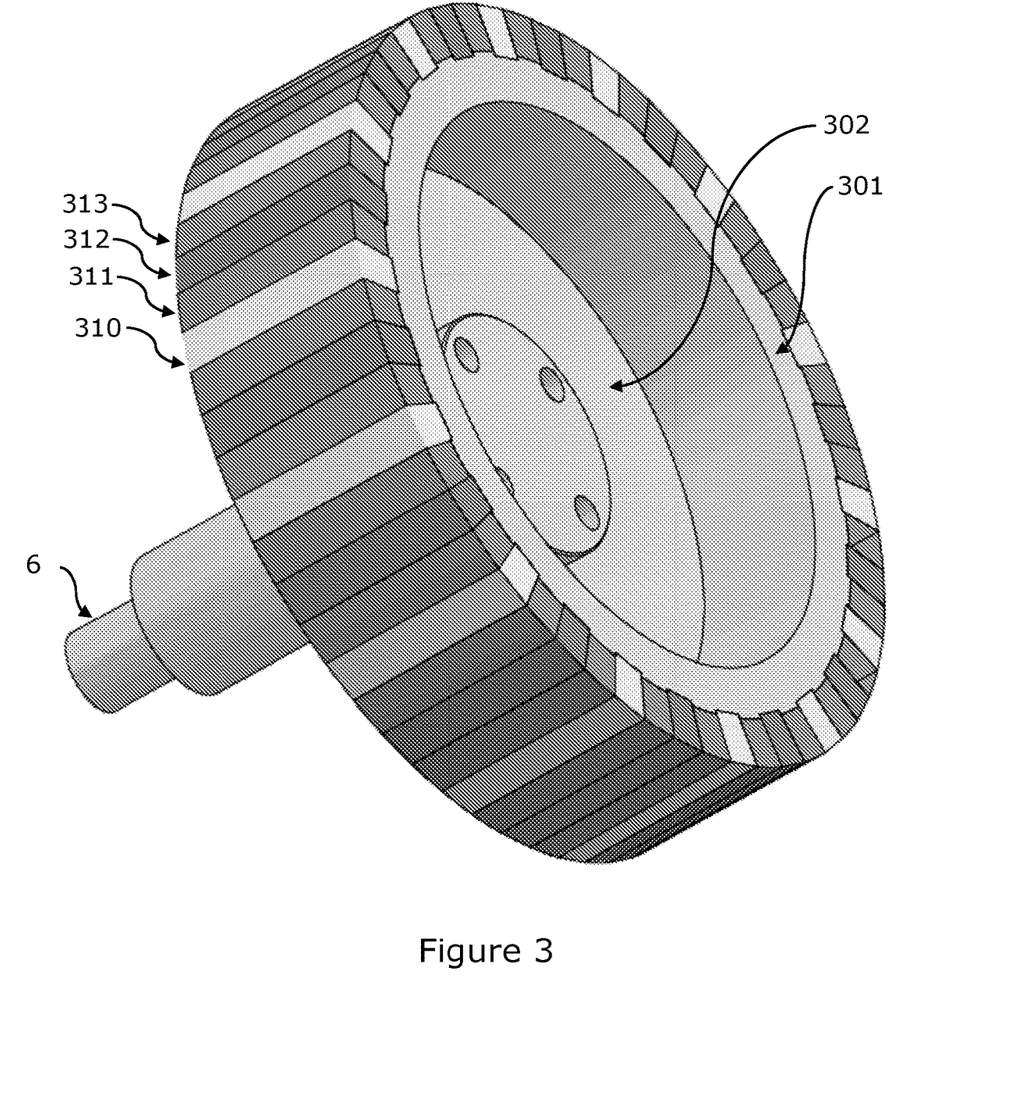
FIG. 3 shows the low speed magnetic rotor according to an embodiment of the invention.

FIG. 3 shows an embodiment of the first rotor, which for the present embodiment means the slower rotating rotor. The magnetic design is using a Halbach array. A Halbach array is a special arrangement of permanent magnets that augments the magnetic field on one side of the array while cancelling the field to near zero on the other side.

Figure 8:
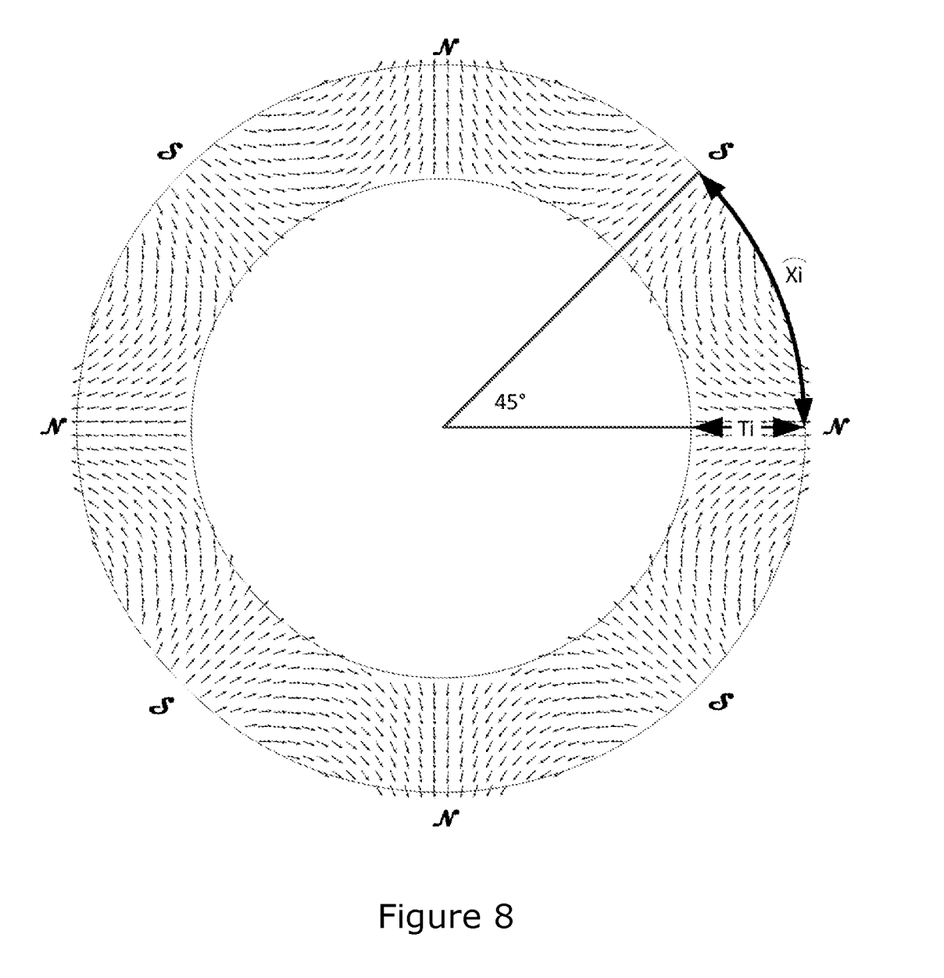
FIG. 8 shows an optimal magnetic design for a rotor magnet.

FIG. 8 shows the magnetic flux lines of a rotor design with eight poles, four north poles and four south poles. It also shows the thickness of the magnets T and the length of a magnetic pole N as being the length X.

In an embodiment, the magnets 310, 311, 312, 313 of the Halbach array are designed with a dimension, so it has a ratio of the length of a magnetic pole Xi over the thickness Ti is about 2.5, Xi/Ti=2.5, as this ratio shows the best performance.

The element of the Figure is a shaft 6, which is attached to a rotor flange 302; the rotor flange 302 connects to a rotor back iron cylinder 301. Different means for connecting the rotor flange 302 to the cylinder can be used. FIG. 2 shows that the rotor flange 302 is joint to the cylinder by bolts 304.

The cylinder 301 has the magnetic Halbach array attached to the surface. The magnets consist a first magnet 310 with a field pointing radial out from the cylinder. The next magnet 311 points in a clock wise azimuthal direction followed by a magnet 312 with a field pointing radial into the center of the cylinder followed magnet 313 with a field pointing in a counter clock wise azimuthal direction.

The cylinder 301 may, when made of steel, be designed with grooves in the material, as this will reduce the magnetic eddy current losses in the steel material. Even with the Halbach array, this may be an advantage.

The magnets on either of the rotors can be made of different magnetic material, in is important to mention that magnets of both rotors may not be the same type.

Some magnets may be of a sintered type of magnets, others may be an epoxy-bonded magnet, and the material can be simple ferrite magnets, neodymium-iron-boron or samarium-cobalt.

An advantage of using ferrite magnets is that they are non-electrical conducting, which reduces the losses.

Magnets may be isotropic or anisotropic. By using an isotropic magnet in the rotor side, it may be only one of the rotor or both rotors, the number of magnetic poles of the rotor can altered until the actual magnetization of the isotropic magnet. This allows one rotor design to be used in different applications with different gear ratios, as the number of poles determines the gear ratio.

The stator support element is exposed to the magnetic flux leakage, and thus, means to reduce eddy current losses in the stator support element should be provided. This can be achieved, by using a non-electrical conducting material such as a polymer or a ceramic.

In an embodiment a polymer of the type Bulk Molding Compound (BMC) or bulk molding composite is used, BMC is a ready to mold, glass-fiber reinforced thermoset polyester material primarily used in injection molding and compression molding. BMC is manufactured by mixing strands of chopped glass fibers in a mixer with polyester resin. The glass fibers in BMC result in better strength properties than standard thermoplastic products.

One of the advantages by using BMC is a good thermal property of the material combined with the better strength properties.

The magnetic flux conductors are in an embodiment in-molded in the polymer stator support element 4. The polymer will help conducting heat losses from the flux conductors 3 to the outside surface of the magnetic gear. The outside surface may even be equipped with cooling fins (not shown on any figures).

The design of the magnetic flux conductors 3 is important for a good efficiency of the magnet gear. In a simple design, the magnetic flux conductors are simple blocks or rods of a magnetic conducting material such a silicon iron or SMC (soft magnetic composite). The simple design does not consider an optimal magnet design for each side of the gear, thus an optimal design requires a flux design for each side of the magnetic flux conductors 3.

Soft magnetic composites are iron powder particles separated with an electrically insulated layer. For a long time the powder metallurgy (P/M) process has been used to manufacture SMC components for high frequency inductor applications. These traditional SMC materials consist generally of iron particles distributed in matrix of organic materials.

Some types of SMC materials do not contain any organic matrix which makes it possible to manufacture SMC components with significantly higher saturation induction, permeability as well as lower hysteresis losses. Such non-organic SMC is made with oxide or phosphor layer around each iron particle.

As a result, SMC materials are an alternative to electrical steel sheets and ferrites for a wide range of applications.

The rod shape of the magnetic flux conductors 3 is simple from a manufacturing point of view, as the rods are easy to retain in a matrix. When the magnetic flux conductors 3 are in molded in a polymer, in respect of retaining the conductors 3 the shape is of the conductors is less critical.

This therefore calls for at design where excess material in axial direction is removed. It is most likely that a tapered design at both ends can be used, as the magnetic flux in the conductor is very low at both ends as the flux is led into the magnet of the rotor.

Figure 6:
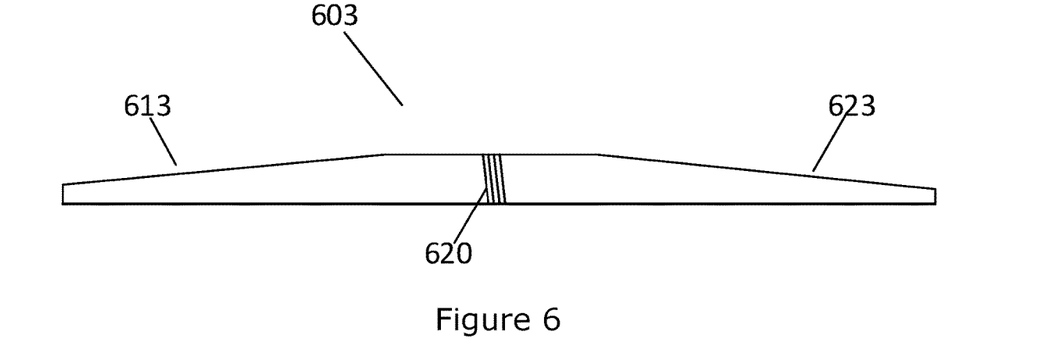
FIG. 6 shows an example of the magnetic flux conductor with tapered ends and with an electric coil.

FIG. 6 shows a the magnetic flux conductor 603, where the conductor is made in SMC material with a first tapered end 613 and a second tapered end 623, with a coil 620 arranged around the conductor 603, the coil is optional.

Studies has also showed that a triangular shaped flux conductor reduces the magnetic flux leakage to the cover. Different shapes has been tested and a shape with a larger area facing the air gap and smaller facing away from the air gap shows better performance.

As the magnetic pole design is different between the two rotors, the area of the flux conductor facing the first air gap might be different from the area facing the second air gap.

In an embodiment, the magnetic flux conductors are tapered at both end in a way so the magnetic flux density is kept at similar level over the full length of the conductor.

In an embodiment the axial length of the first rotor and the axial length of the second are different from each other's. This is especially the case where different type of magnets are used in the two rotor and where the gear ratio is high.

In an embodiment, additional magnets are arranged between the magnet flux conductors in order to increase the magnetic field.

In an embodiment, the two end shields are constructed in a way to reduce magnetic losses in the material. This can be achieved by using laminated steel, grooves in the shield or by using a none electrical conducting material. Such material can also be a polymer, e.g. BMC As the magnetic gear of the present invention is arranged with one bearing for each rotor, the two end shields and the stator support element forms an open stator chamber wherein the two rotors are running. The two rotors are arranged in respect of each other with an axial gap.

The axial gap has an effect on the performance of the gear as the reluctance of the gear is increased with increased axial gap. The longer the axial gap is the larger will the leakage flux between the magnetic flux conductors be.

In an embodiment, the stator chamber is divided by a wall, wherein the wall is located in the axial gap, whereby the first rotor runs in a first stator chamber and the second rotor runs in a second stator chamber.

In an embodiment of the present invention, a first fluid is present in the first stator chamber and a second fluid is present in the second stator chamber.

The first fluid is preferably in gaseous phase, and the second fluid may be in a liquid phase.

A fluid is understood to cover of both liquids and gases.

In an embodiment, the second chamber is arranged as a pumping chamber with an inlet and an outlet, wherein the first magnetic rotor drives an impeller for moving a liquid from the inlet to the outlet of the second chamber.

Figure 7:
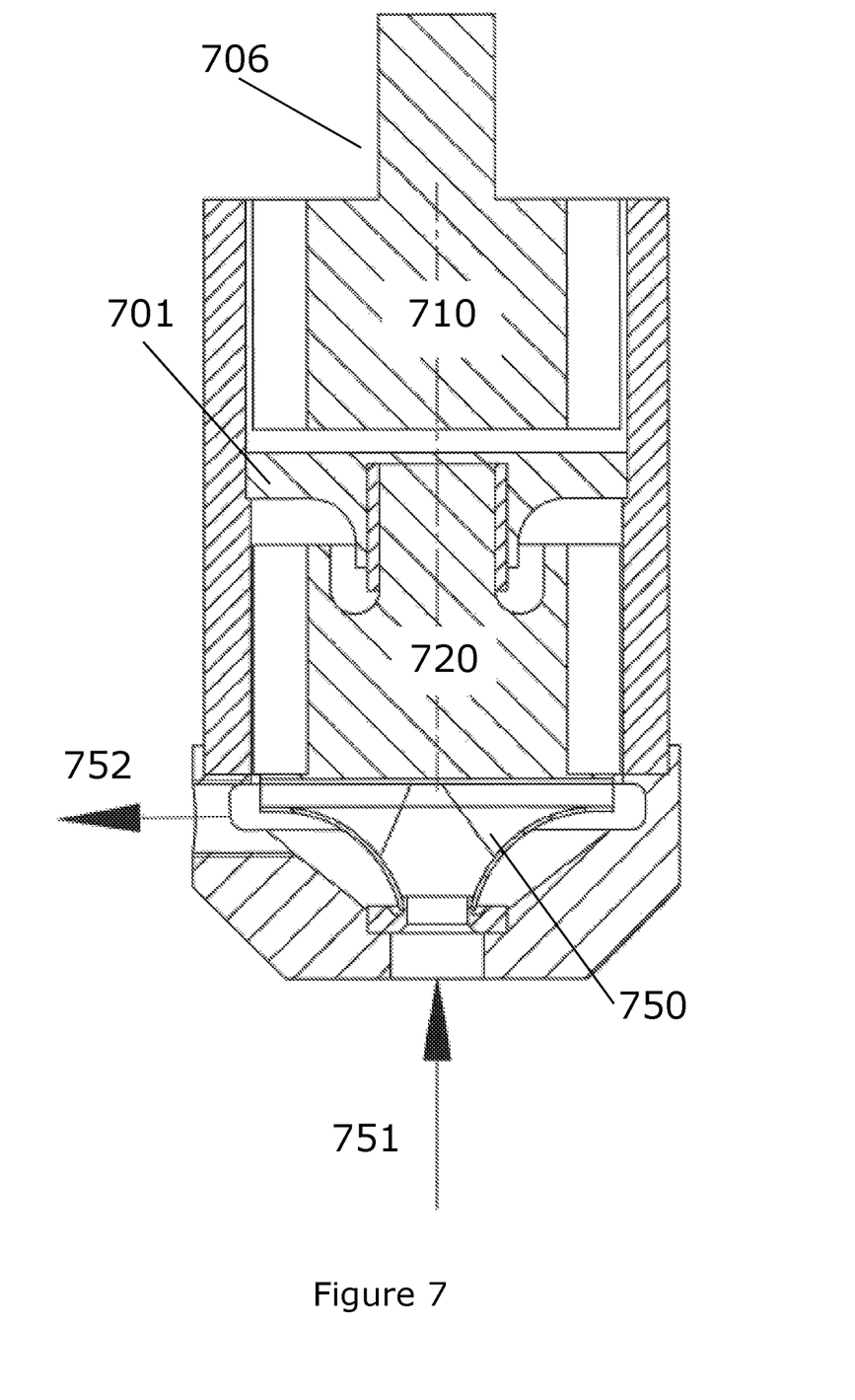
FIG. 7 shows an example of magnetic gear with a pump.

FIG. 7 shows an embodiment, where an external torque drives the first rotor 710 applied to the first shaft 706. The second rotor 720 drives an impeller 750, where the impeller 750, when rotated ensures movement of a liquid fluid from the inlet 751 to the outlet 752. The wall 701 ensures that the pump liquid sealed from the area of the first rotor 710.

In an embodiment, the magnetic flux conductors are skewed in relation to the magnetic poles on the rotors. An effect of the skewing is that it reduced the cogging torque of the gear, but on the other hand, it also introduces a force pointing in the axial direction. Such a force may require that the bearings are designed to receive a torque in that direction.

In an embodiment, the magnetic flux conductors are designed with a V-shape or a double V-shape, so the skewing appears to be double, whereby the axial torque is reduced. V-shape will behave like skewing of the magnetic flux conductors, but it may have an impact on the efficiency.

In an embodiment, the one of the end shields is designed for receiving an electrical motor/generator. This includes an end shield with a flange and holes for attaching the electrical motor (not shown in the figures). Also in an embodiment the rotor of the receiving end, may have a coupling device to receive the shaft of the electrical motor directly without further shafts. In this embodiment, the electrical motor is a flange motor, often made in standard dimensions. In an embodiment, the flange motor is mounted directly on the stator support element without the end shield, in the end wherein the flange motor is received.

In an embodiment, at least one electrical coil is inserted around at least one of the magnetic flux conductors. Such a coil can have a plurality of windings. The coil can have different purposes; one can be for measurement of operational parameters such as magnet flux, including amplitude and frequency, but also position.

The coil can be placed length wise around the magnetic flux conductor 3, where the air gap between the two magnetic rotors is. At that location the highest magnetic flux is expected to be present, as this is where all the magnetic flux is transferred from the first rotor to the second rotor.

FIG. 6 shows the magnetic flux conductor 603 with a coil 620 arranged around the conductor 603. The conductor is made in SMC material with a first tapered end 613 and a second tapered end 623. In another embodiment, the coil 620 can also be used where the conductor 603 is made of laminated steel, the tapered part is more difficult to realize with lamination depending on the direction of the lamination, and the coil can be used for all designs of the magnetic flux conductors 3, 603.

Another purpose can be for energy harvesting or energy injecting. Where energy injecting can be used as a boost function for the gear, i.e. electrical current is applied to the coil whereby the coil works as at stator winding.

In an embodiment, a combination of measurement and energy coils are used, as a boost function will require a closed loop control system with good measurement of the operation of the gear.

In summary the invention relates to, a magnetic gear comprising a first magnetic rotor with a first shaft; and a second magnetic rotor with a second shaft; a support structure, with a first end shield and a second end shield connected by a stator support element. A first bearing attached to the first end shield supports the first shaft and a second bearing supports the second shaft. The first and second magnetic rotors are displaced in axial direction from each other in an axial gap; and the first shaft and second shaft are approximately aligned in opposite axial directions; and a plurality of magnetic flux conductors encircles the first and second magnetic rotors, thereby conducting magnetic flux from the first magnetic rotor to the second magnetic rotor. The magnetic gear comprises a dividing wall arranged in the axial gap between the first magnetic rotor and the magnetic second rotor, to separate a first chamber from a second chamber.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refer to one or more of those items.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A magnetic gear comprising
a first magnetic rotor (210) with a first shaft (6); and
a second magnetic rotor (220) with a second shaft (7);
a support structure, comprising a first end shield (5a) and a second end shield (5b) connected by a stator support element (4);
wherein the first shaft (6) is supported by a first bearing (1a) attached to the first end shield (5a) and the second shaft (7) is supported by a second bearing (1b), the first and second magnetic rotors (210, 220) are displaced in axial direction from each other in an axial gap; and
wherein the first shaft and second shaft are approximately aligned in opposite axial directions; and
wherein a plurality of magnetic flux conductors (3) encircles the first and second magnetic rotors, thereby conducting magnetic flux from the first magnetic rotor (210) to the second magnetic rotor (220); and
the magnetic gear comprises a dividing wall (201) arranged in the axial gap between the first magnetic rotor and the second magnetic rotor, to separate a first chamber from a second chamber.

2. The magnetic gear according to claim 1, wherein the first chamber is arranged for a first fluid and the second chamber is arranged for a second fluid.

3. The magnetic gear according to claim 2, wherein the first fluid is in a gaseous phase, and the second fluid is in a liquid phase.

4. The magnetic gear according to claim 2, wherein the second chamber is arranged as a pumping chamber with an inlet (751) and an outlet (752), and wherein the second magnetic rotor is arranged to drive an impeller (750) for moving the second fluid from the inlet (751) to the outlet (752) of the second chamber.

5. The magnetic gear according to claim 1, wherein at least the stator support element (4) is made of a non-electrical conducting materiel, such as a polymer or a ceramic material.

6. The magnetic gear according to claim 5, wherein the magnetic flux conductors are in molded in a polymer material of the stator support element.

7. The magnetic gear according to claim 6, wherein the second chamber is sealed with the polymer material.

8. The magnetic gear according to claim 1, wherein the magnetic flux conductors (3) are made of a soft magnetic composite.

9. The magnetic gear according to claim 8, wherein the shape of the magnetic flux conductors (3) is triangular, with one side of triangle facing the magnetic rotor.

10. The magnetic gear according to claim 8, wherein each of the magnetic flux conductors (3) is having a first tapered end and a second tapered end.

11. The magnetic gear according to claim 1, wherein the plurality of magnetic flux conductors (3) being retained by the first and second end shields.

12. The magnetic gear according to claim 1, wherein at least one of the first and second magnetic rotors comprises an isotropic magnet.

13. The magnetic gear according to claim 1, wherein at least one of the first and second magnetic rotor (210, 220) comprises Halbach array, for maximizing the magnetic torque.

14. The magnetic gear according to claim 1, wherein a locking device (42, 43) retains the magnetic material, said locking device locks the magnetic material in at least one recess (202) in the magnetic material (233) of the rotor.

15. The magnetic gear according to claim 1, at least one electrical coil (620) is inserted around at least one of the magnetic flux conductors (3, 603).

* * * * *